(12) United States Patent
Horvath

(10) Patent No.: US 7,032,372 B1
(45) Date of Patent: Apr. 25, 2006

(54) CHAIN LINK

(75) Inventor: Dan Horvath, Phoenix, AZ (US)

(73) Assignee: Genlyte Thomas Group, LLC, Louisville, KY (US)

( * ) Notice: Subject to any disclaimer, the term of this patent is extended or adjusted under 35 U.S.C. 154(b) by 0 days.

(21) Appl. No.: 10/888,173

(22) Filed: Jul. 9, 2004

(51) Int. Cl.
*F16G 15/04* (2006.01)
*B60C 27/06* (2006.01)

(52) U.S. Cl. .................................. 59/78; 59/85; 59/93
(58) Field of Classification Search ............... 59/78, 59/84, 85, 93
See application file for complete search history.

(56) References Cited

U.S. PATENT DOCUMENTS

| 975,323 | A |   | 11/1910 | Brown |   |
|---|---|---|---|---|---|
| 1,229,244 | A |   | 6/1917 | Eckert |   |
| 1,376,299 | A |   | 4/1921 | Sullivan |   |
| 1,411,836 | A |   | 4/1922 | Bond |   |
| 1,572,980 | A |   | 2/1926 | Young |   |
| 2,260,630 | A | * | 10/1941 | Mckinnon et al. | 59/78 |
| 2,824,421 | A | * | 2/1958 | Nelson | 59/85 |
| 3,061,999 | A |   | 11/1962 | O'Brien |   |
| 4,063,583 | A |   | 12/1977 | Rieger |   |
| 4,102,378 | A |   | 7/1978 | Weidler |   |
| 4,353,203 | A |   | 10/1982 | Lotoski |   |

* cited by examiner

*Primary Examiner*—David B. Jones
(74) *Attorney, Agent, or Firm*—Middleton Reutlinger

(57) ABSTRACT

A chain link is designed in the form of a main body portion which is shaped into a loop enclosing an open interior space. Adjacent ends of the loop are spaced from one another and are disposed at a first acute angle to a centerline of the loop of the main body portion. The adjacent ends further are each tapered away from the opening by flats at a second acute angle on opposite sides of the centerline in both of the adjacent ends.

21 Claims, 2 Drawing Sheets

CHAIN LINK

BACKGROUND

This invention relates to chains having links which may be readily removed and replaced.

DETAILED DESCRIPTION

Figure 1:
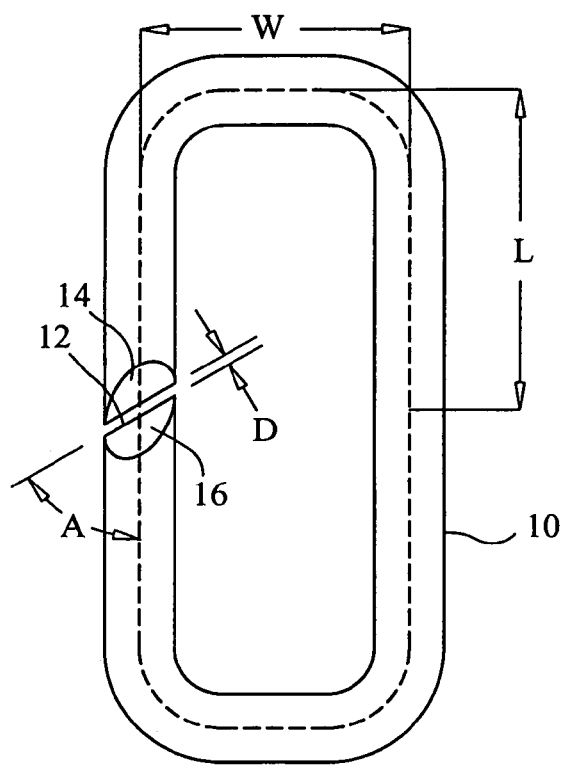
FIG. 1 is a top view of an embodiment of the invention.
Figure 2:
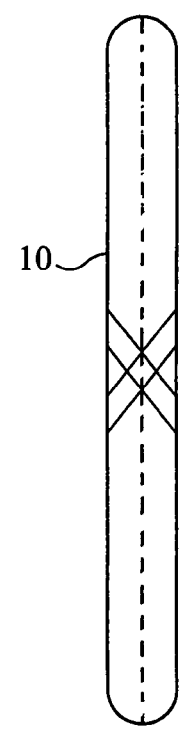
FIG. 2 is a side view of the embodiment shown in FIG. 1.

Reference now should be made to the drawings, in which the same reference numbers are used throughout the different figures to designate the same or similar components. FIGS. 1 through 4 illustrate details of an embodiment of a chain link which may be used to form chains of any desired length by interconnecting the links or removing links to form the chain. The design of the link is uniquely adapted to allow interconnection or disconnection of successive links without requiring any tools, and effected in a quick simple fashion.

The link may be made of wire or rod stock of any suitable material providing the necessary strength for the use which ultimately is to be employed by the chain. Typical materials for the basic stock are brass, steel or aluminum rods which may be bent into closed loop shapes, either of a generally rectangular configuration as shown in the various figures of the drawing, or in oval or circular configurations, depending upon the particular esthetic appearance which is desired for the finished chain. It also is possible to form the link from castings or molds in the shape shown in FIGS. 1 through 4 where materials other than metals may be employed to form links in their finished shape without requiring the bending of elongated rods of stock material. The particular material of which the link is to be made and the specific shape (i.e. circular, rectangular, oval etc.) generally is dictated by the end use which is to be made of a chain using the specific link construction which is employed. The structure, however, generally is in the form of a loop enclosing an interior open space, with the loop being completed by two adjacent ends spaced apart a short distance (D in FIG. 1) from one another.

In the embodiment shown in the various figures of the drawings, the link 10 is in the form of an elongated rectangular shape having a length 2L for a centerline or center axis and a width W for the same centerline or axis of the link. In the embodiment illustrated in the various figures of the drawing, the link material 10 is formed of an elongated rod or wire having a circular cross section; although other cross-sectional configurations can be employed as well.

At the point where the two ends of the link terminate at the space 12, the ends are located a short distance D apart at an acute angle A, which in a commercial embodiment has been selected to be 60°. An acute angle A is chosen, rather than a right angle at the space 12, in order to prevent subsequent accidental disassembly of the links in a completed chain.

Figure 3:
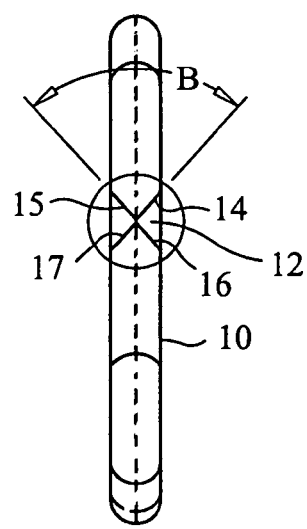
FIG. 3 is an angled side view of the embodiment shown in FIGS. 1 and 2.
Figure 4:
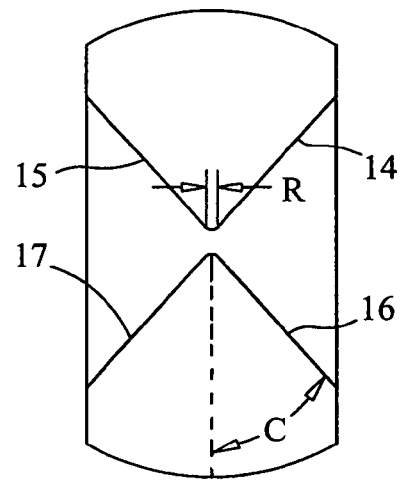
FIG. 4 is an enlarged detail of the portion circled in FIG. 3.

In addition to placing the ends of the loop of the link at an acute angle to the central axis or centerline of the link 10, the ends, which face one another, are tapered away from the opening 12 by flats at acute angles 14 and 15 for the upper end shown in FIGS. 1 and 3, and 16 and 17 for the lower end, shown in FIGS. 1 and 3. The angles are substantially identical on each side of the centerline to form a composite angle B selected to be slightly less than 90°. This results in the acute angle between the surface and the centerline of the link for each of the flats 14,15,16 and 17 of something slightly less than 45°, typically 43°. The reason for this is that the theoretical ideal angle is 45° to provide a maximum thickness or strength at the termination ends of the two facing portions of the link at the gap or opening 12. Greater angles (which would result in a corresponding lesser angle B) would cause the ends of the links to be thinner, and therefore weaker. If, however, manufacturing tolerances are not absolutely precise, the sloping of the surfaces of the flats 14,15,16,17 at 45°, could result in an inability to slide adjacent links 10 together or to pull them apart. Consequently, it is preferable, from a manufacturing tolerance standpoint, to cause the angle to be something less than 45°, namely the 43° (angle C) slope mentioned above. As shown in detail in FIG. 4, the facing tips of the sloped ends of the main body portion of the link forming the loop are provided with a slightly rounded radius (R) at the facing opening.

Figure 5:
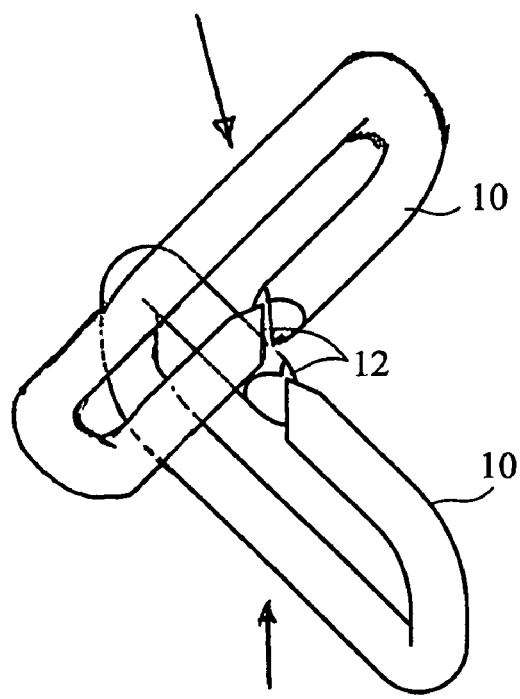
FIG. 5 illustrates the manner of assembling links of the type shown in FIGS. 1 through 4.
Figure 6:
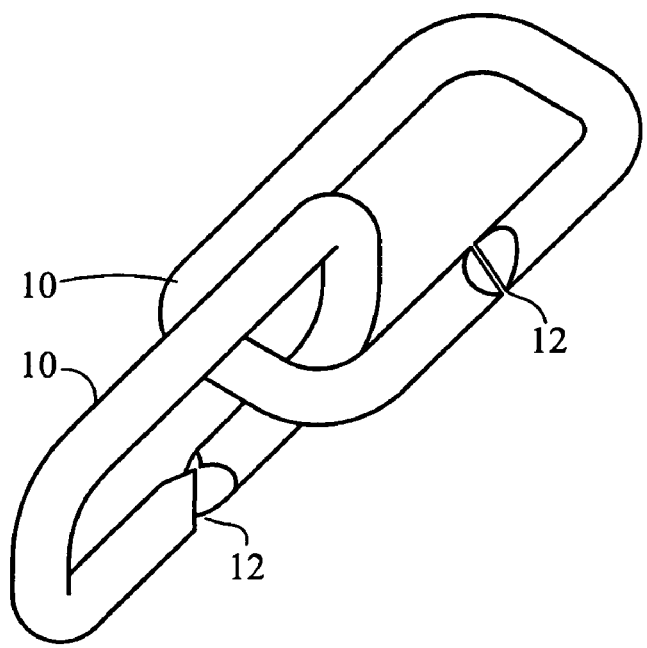
FIG. 6 is an assembled view of a pair of links of the type shown in FIGS. 1 through 4.

With a link constructed as described above, adjacent links may be assembled together without requiring the use of any tools by sliding them together with aligned openings 12 in the two links. This is illustrated in FIG. 5 by an upper link 10, which is tipped slightly toward the left, as illustrated in FIG. 5, to mate the opening 12 of the upper link 10 with the sloped opening 12 of a lower link 10, in order to slide the two open ends of the adjacent links through the aligned slots or openings 12 to interconnect the links. Once this is done, the links 10 may be stretched or pulled apart to the configuration shown in FIG. 6. The number of links which are interconnected together may be any suitable number desired to form a chain of links of whatever length is required for the particular application. It should be noted that if a chain is to be shortened, the process shown in FIG. 5 simply is reversed to remove as many links as needed in order to shorten the chain to a desired length.

It also should be noted that by providing the angle A and the sloped surfaces 14,15,16,17 at the angle C as described above, the opening D between adjacent ends of the link may be quite small compared to the diameter or thickness of the material forming the actual link itself. As long as the slopes C are 45° or less from the centerline of the link, the width D can be any small practical amount, irrespective of the diameter (in the case of a circular cross section link), or cross-sectional thickness of the material forming the link 10 itself. By placing the facing surfaces 14,15,16,17 adjacent the space 12 at an acute angle to the centerline or central axis of the link, any direct 90° force attempting to separate two adjacent links, even when the openings or gaps 12 directly abut one another, will not separate the adjacent links. It is necessary to tip the links 10 at the angle (A) described above in conjunction with FIG. 5, and which is readily apparent from FIG. 1, in order to separate the links. A force in this direction typically is not encountered in the use of a chain employing the links. Consequently, a very secure chain is provided, even when subjected to pulling forces at the weakest point, namely at the location of the space 12. Also as noted above, the utilization of an acute angle C which is close to 45° provides a maximum amount of material at the location of the opening 12 further maintaining the strength and integrity of the chain which employs the links.

The foregoing description of the preferred embodiment of the invention is to be considered as illustrative and not limiting. Various changes and modifications will occur to those skilled in the art for performing substantially the same function, in substantially the same way, to achieve substantially the same result, without departing from the true scope of the invention as defined in the appended claims.

What is claimed is:

1. A chain link for use with a light fixture including in combination:
   a main body potion in the form of a loop enclosing an interior opening space, the loop having an opening therein defined by adjacent ends spaced from one another, the ends disposed at a first acute angle to a centerline of the loop of the main body portion, said main body generally having a single cross-sectional shape between the ends, the adjacent ends each further tapered away from the opening by flats at the first acute angle and a second acute angle on opposite sides of the centerline in both of the adjacent ends of the loop.

2. A chain link according to claim 1 wherein the main body portion has a circular cross section of a predetermined diameter and the opening between the adjacent ends of the loop is less than the predetermined diameter.

3. A chain link according to claim 2 wherein the centerline of the loop is the central axis of the main body portion.

4. A chain link according to claim 3 wherein the opening between the adjacent ends of the loop is substantially less than the predetermined diameter of the main body portion.

5. A chain link according to claim 4 wherein the second acute angle is substantially 45°.

6. A chain link according to claim 5 wherein the first acute angle is substantially 60°.

7. A chain link according to claim 6 wherein the second acute angle is 43°.

8. A chain link according to claim 1 wherein the cross-sectional thickness of the main body portion is a first predetermined amount and the opening between the adjacent ends of the loop is less than the first predetermined amount.

9. A chain link according to claim 8 wherein the centerline of the loop is the central axis of the main body portion.

10. A chain link according to claim 9 wherein the second acute angle is substantially 45°.

11. A chain link according to claim 10 wherein the first acute angle is substantially 60°.

12. A chain link according to claim 11 wherein the loop is in the form of an elongated rectangle.

13. A chain link according to claim 12 wherein the opening between the adjacent ends of the loop is substantially less than the cross-sectional thickness of the main body portion.

14. A chain link according to claim 13 wherein the second acute angle is 43°.

15. A chain link according to claim 1 wherein the loop is in the form of an elongated rectangle.

16. A chain link according to claim 1 wherein the opening between the adjacent ends of the loop is substantially less than the cross-sectional thickness of the main body portion.

17. A chain link according to claim 1 wherein the second acute angle is 43°.

18. A chain link including in combination: a main body portion in the form of a loop enclosing an interior open space, the loop having an opening therein defined by adjacent ends spaced from one another and disposed at a first angle of substantially 60° to a centerline of the loop of the main body portion, the adjacent ends each further tapered away from the opening by flats at the first angle and a second acute angle on opposite sides of the centerline in both of the adjacent ends of the loop.

19. A chain link including in combination a main body portion generally of a single cross-sectional shape, in the form of a loop enclosing an interior open space, the loop having an opening therein defined by adjacent ends spaced from one another and disposed at a first angle of substantially 60° to a centerline of the loop of the main body portion, the adjacent ends each further tapered away from the opening by flats at the first angle and a second angle of substantially 45° on opposite sides of the centerline in both of the adjacent ends of the loop.

20. A chain formed by a combination of at least two chain links, comprising:
   a first chain link having a main body portion in the form of a loop enclosing an interior opening space, the loop having an opening therein defined by adjacent ends spaced from one another, and disposed at a first acute angle to a centerline of the loop of the main body portion, the adjacent ends each further tapered away from the opening by flats at the first angle and a second acute angle on opposite sides of the centerline in both of the adjacent ends of the loop;
   a second chain link having a main body portion in the form of a loop enclosing an interior opening space, the loop having an opening therein defined by adjacent ends spaced from one another, and the ends disposed at a first acute angle to a centerline of the loop of the main body portion, the adjacent ends each further tapered away from the opening by flats at the first angle and a second acute angle on opposite sides of the centerline in both of the adjacent ends of the loop;
   wherein said first acute angle of said first and second chain links require said first link to be rotated about two axes to connect and disconnect said first and second chain links.

21. The combination of claim 20, said two axes being a vertical axis and a horizontal axis.

* * * * *